United States Patent
Chen et al.

(10) Patent No.: US 10,176,014 B2
(45) Date of Patent: Jan. 8, 2019

(54) SYSTEM AND METHOD FOR MULTITHREADED PROCESSING

(71) Applicant: Futurewei Technologies, Inc., Plano, TX (US)

(72) Inventors: Liya Chen, San Jose, CA (US); Chen Tian, Union City, CA (US); Feng Ye, Mississauga (CA); Ziang Hu, Union City, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/810,205

(22) Filed: Jul. 27, 2015

(65) Prior Publication Data

US 2017/0031708 A1   Feb. 2, 2017

(51) Int. Cl.
*G06F 9/46* (2006.01)
*G06F 9/50* (2006.01)
*G06F 9/48* (2006.01)

(52) U.S. Cl.
CPC .................. *G06F 9/50* (2013.01); *G06F 9/48* (2013.01); *G06F 9/4812* (2013.01); *G06F 9/4881* (2013.01); *G06F 9/5005* (2013.01); *G06F 9/505* (2013.01); *G06F 9/5011* (2013.01); *G06F 9/5027* (2013.01); *G06F 9/5044* (2013.01); *G06F 9/5055* (2013.01); *G06F 9/5083* (2013.01); *G06F 2209/5013* (2013.01)

(58) Field of Classification Search
CPC . G06F 9/48; G06F 9/4881; G06F 9/50; G06F 9/5005; G06F 9/5011; G06F 9/5027; G06F 9/5044; G06F 9/505; G06F 9/5055
See application file for complete search history.

(56) References Cited

U.S. PATENT DOCUMENTS

| | | |
|---|---|---|
| 8,839,258 B2 | 9/2014 | Rakvic et al. |
| 8,839,259 B2 | 9/2014 | Li et al. |
| 9,069,564 B1 | 6/2015 | Rashid et al. |
| 2002/0194377 A1 | 12/2002 | Doolittle et al. |
| 2006/0224588 A1 | 10/2006 | Laonipon et al. |
| 2008/0104610 A1* | 5/2008 | Norton ............... G06F 11/3419 718/108 |

(Continued)

FOREIGN PATENT DOCUMENTS

| | | |
|---|---|---|
| CN | 102629220 A | 8/2012 |
| WO | 2015096031 A1 | 7/2015 |

OTHER PUBLICATIONS

Baer, J-L., "Multiprocessing Systems," IEEE Transactions on Computers, vol. C-25, No. 12, Dec. 1976, pp. 1270-1277.

(Continued)

*Primary Examiner* — Charles M Swift
(74) *Attorney, Agent, or Firm* — Slater Matsil, LLP

(57) ABSTRACT

A method for operating a multithread processing system is provided, including assigning, by a controller, a subset of a plurality of tasks to a plurality of threads during a time N, collecting, by the controller, data during the time N concerning the operation of the plurality of threads, analyzing, by the controller, the data to determine at least one condition concerning the operation of the plurality of threads during the time N, and adjusting, by the controller, a number of the plurality of threads available in time N+1 in accordance with the at least one condition.

20 Claims, 5 Drawing Sheets

(56) References Cited

U.S. PATENT DOCUMENTS

| | | | |
|---|---|---|---|
| 2008/0163174 A1* | 7/2008 | Krauss | G06F 9/526 717/127 |
| 2009/0007108 A1* | 1/2009 | Hanebutte | G06F 11/3409 718/1 |
| 2009/0150898 A1 | 6/2009 | Sohn et al. | |
| 2009/0165007 A1* | 6/2009 | Aghajanyan | G06F 9/4881 718/103 |
| 2010/0011360 A1* | 1/2010 | Fontenot | G06F 9/526 718/100 |
| 2011/0041132 A1* | 2/2011 | Andrade | G06F 9/5083 718/102 |
| 2011/0126204 A1* | 5/2011 | Omara | G06F 9/526 718/103 |
| 2012/0084541 A1* | 4/2012 | Mattikalli | G06Q 10/04 713/1 |
| 2012/0089991 A1* | 4/2012 | Scheerer | G06F 11/3632 719/318 |
| 2012/0254822 A1* | 10/2012 | Lin | G06F 9/5083 717/101 |
| 2012/0284720 A1* | 11/2012 | Cain, III | G06F 9/4881 718/101 |
| 2013/0074094 A1* | 3/2013 | Lewis | G06F 9/4881 718/104 |
| 2014/0019984 A1* | 1/2014 | Li | G06F 9/5027 718/102 |
| 2014/0033206 A1* | 1/2014 | Findeisen | G06F 11/3414 718/100 |
| 2016/0092268 A1* | 3/2016 | Gleyzer | G06F 9/44505 718/107 |
| 2016/0188379 A1* | 6/2016 | Rajappa | G06F 9/52 718/107 |

OTHER PUBLICATIONS

Blumofe, R.D., et al., "Scheduling Multithreaded Computations by Work Stealing," Proceedings of the 35th Annual IEEE Conference on Foundations of Computer Science (FOCS'94), Santa Fe, New Mexico, Nov. 20-22, 1994, pp. 1-13.

"Intel Unveils New Product Plans for High-Performance Computing," http://www.intel.com/pressroom/archive/releases/2010/20100531comp.htm, pp. 1-2.

Olivier, S.L., et al., "Scheduling Task Parallelism on Multi-Socket Multicore Systems," Proceedings of the 1st International Workshop on Runtime and Operating Systems for Supercomputers (ROSS '11), May 31, 2011, 8 pages.

Porterfield, A., et al., "Adaptive Scheduling Using Performance Introspection," RENCI Technical Report Series, TR-12-02, 2012, 11 pages.

* cited by examiner

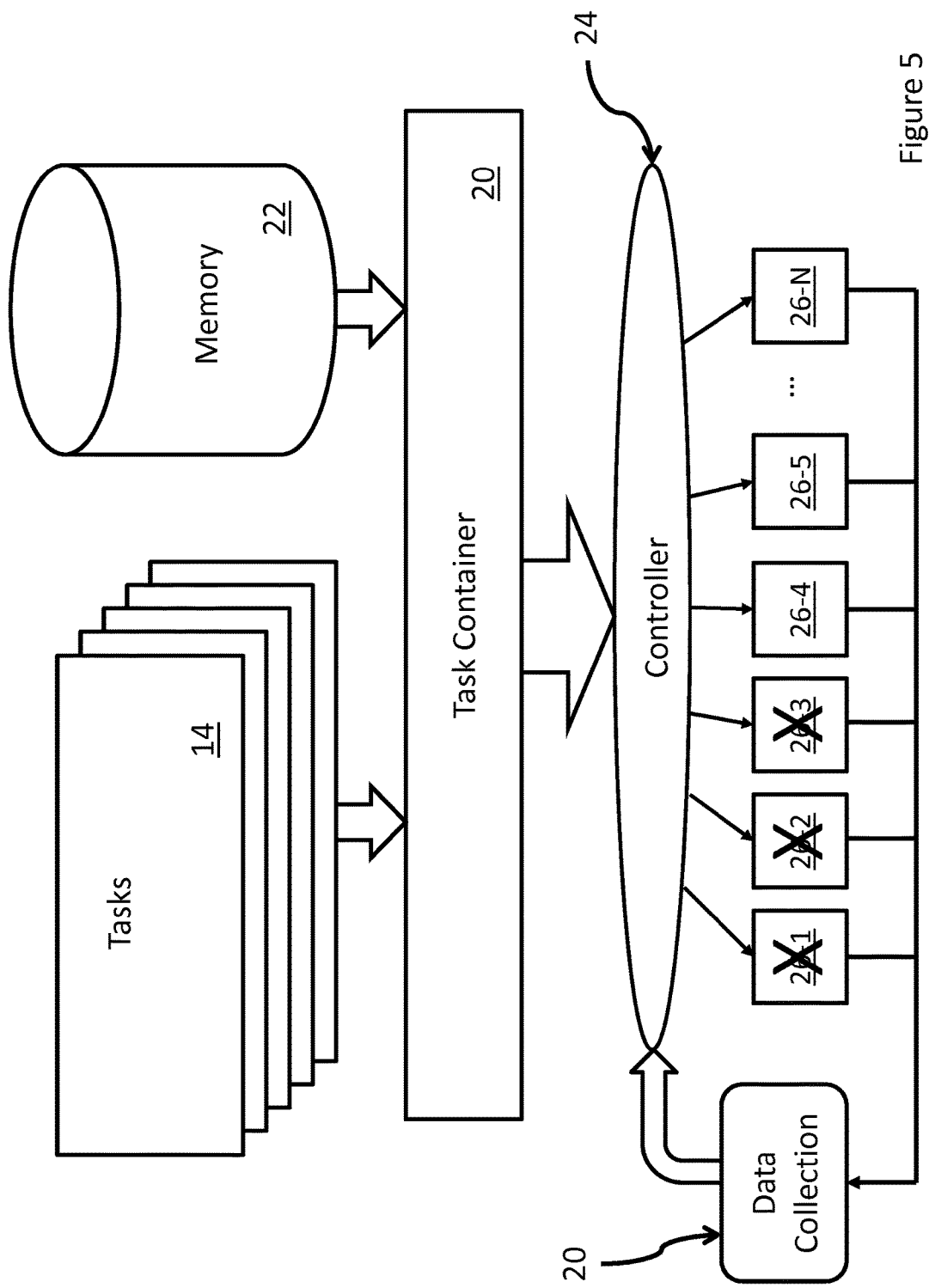

SYSTEM AND METHOD FOR MULTITHREADED PROCESSING

TECHNICAL FIELD

The present invention relates to systems and methods for managing the operation of multiprocessor computing systems and, in particular embodiments, to systems and methods for multicore microprocessors.

BACKGROUND

Current hardware technology has developed System-on-Chip (SOC) devices with multiple cores. Currently, SOCs with 12 to 64 hardware threads exist, and there are plans for chips with 50+ cores (Intel Unveils New Product Plans for High-Performance Computing, http://www.intel.com/pressroom/archive/releases/2010/20100531comp.htm). In addition, multiprocessing computing systems have been developed that use from two to thousands of processors (Multiprocessing Systems, IEEE Transactions on Computers, Vol. C-25, No. 12, December 1976, http://63.84.220.100/csdl/trans/tc/1976/12/01674594.pdf). To take advantage of these multiprocessor or multithread systems, operating systems divide applications into discrete tasks that can be processed separately.

However, there are trade-offs between the number of threads used and the overhead accompanying multiple threads. When tasks on separate threads are completed, the results usually must be coordinated with tasks running on other threads. This creates difficult timing issues because tasks often require different amounts of time to accomplish. Also, subsequent tasks may require results from current tasks. This creates difficult synchronization issues. Another issue is power consumption. If all hardware threads are running at full capacity, the chip's power delivery systems may be over-taxed and may generate more heat than can be safely dissipated. One of the key challenges for parallel runtime systems is how to use hardware threads efficiently and to provide the best performance.

SUMMARY OF THE INVENTION

A method for operating a multithread processing system is provided, including assigning, by a controller, a subset of a plurality of tasks to a plurality of threads during a time N, collecting, by the controller, data during the time N concerning the operation of the plurality of threads, analyzing, by the controller, the data to determine at least one condition concerning the operation of the plurality of threads during the time N, and adjusting, by the controller, a number of the plurality of threads available in time N+1 in accordance with the at least one condition.

A multithread processing system controller is provided. The multithread processing system controller includes a storage system storing programming and a processor coupled to the storage system and executing the programming. The programming configures the multithread processing system controller to assign a subset of the plurality of tasks to a plurality of threads during a time N, collect data during the time N concerning the operation of the plurality of threads, analyze the data to determine at least one condition concerning the operation of the plurality of threads during the time N, and adjust a number of the plurality of threads available in time N+1 in accordance with the at least one condition.

BRIEF DESCRIPTION OF THE DRAWINGS

For a more complete understanding of the present invention, and the advantages thereof, reference is now made to the following descriptions taken in conjunction with the accompanying drawing, in which:

FIG. 5 is an illustration showing a throttling operation performed by the embodiment of FIG. 2.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
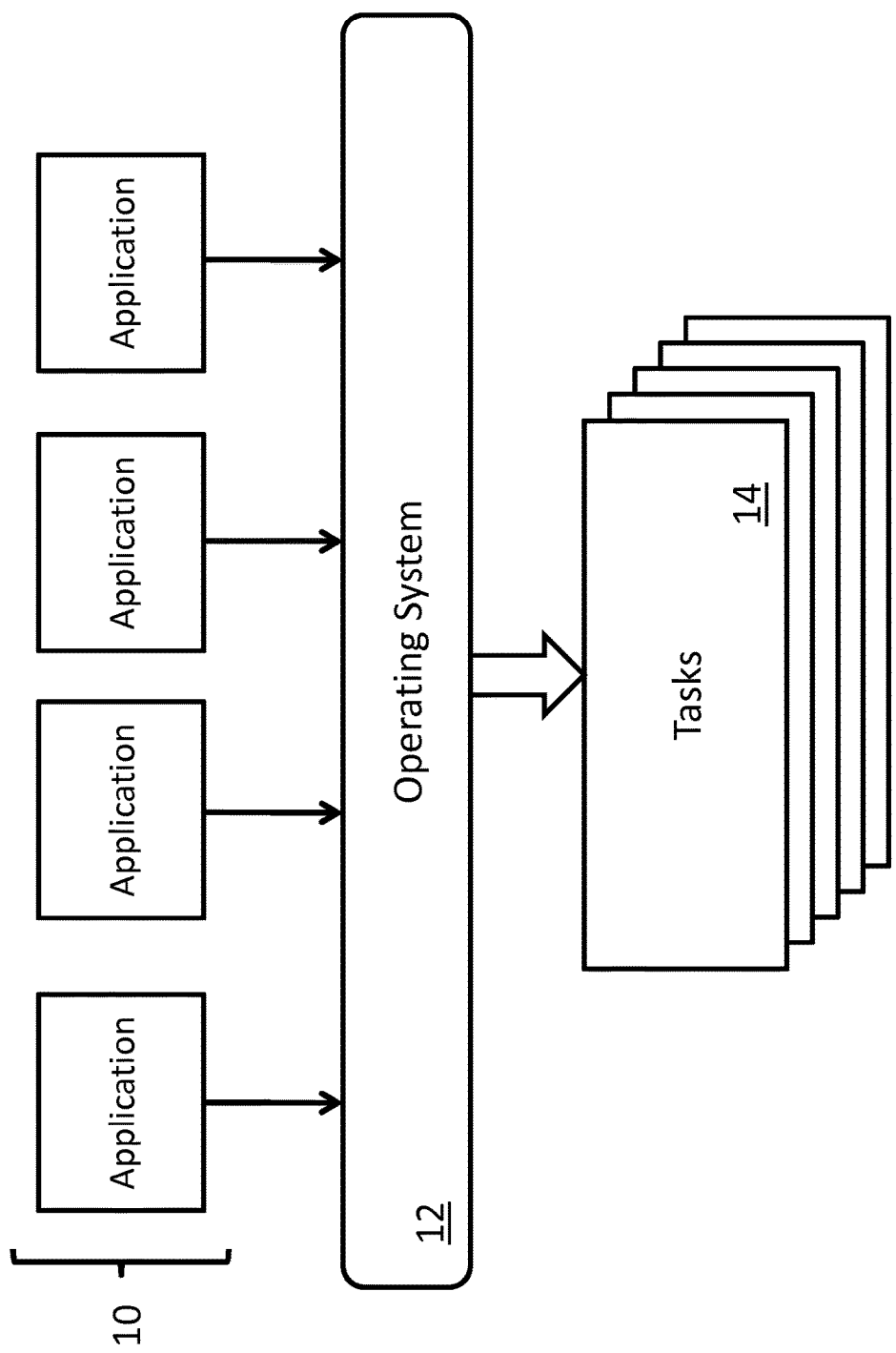
FIG. 1 illustrates the operation of an operating system for use in a multithreaded processing system.

FIG. 1 is a block diagram showing the basic operation of a multithread processing system including multiple processors. An example of such a system is a smart phone having a multicore processor. Another example is a virtualization environment wherein multiple virtual machines (VMs) can be instantiated and used for processing at least part of a processing job or application. However, other systems and devices are contemplated and are within the scope of the description and claims. One or more applications are initiated by calls from operating system 12. Operating system 12 is designed to exploit multithreaded systems (a thread is a discrete processing unit, such as a single processor in a multiprocessor system or a single core in a multicore system). To do this, operating system 12 breaks the work to be done into relatively discrete tasks 14. These tasks may be performed for an application or the operating system itself. The goal is to process the tasks as efficiently as possible.

To achieve this, the operating system creates tasks that require as little data from a concurrently running thread as possible. It is also desirable that no two threads require the same data from memory at the same time. This and many other characteristics of the operating threads can create problems such as stalling while one thread waits for the completion of another and excess power usage when all threads are concurrently running power-intensive processes.

Figure 2:
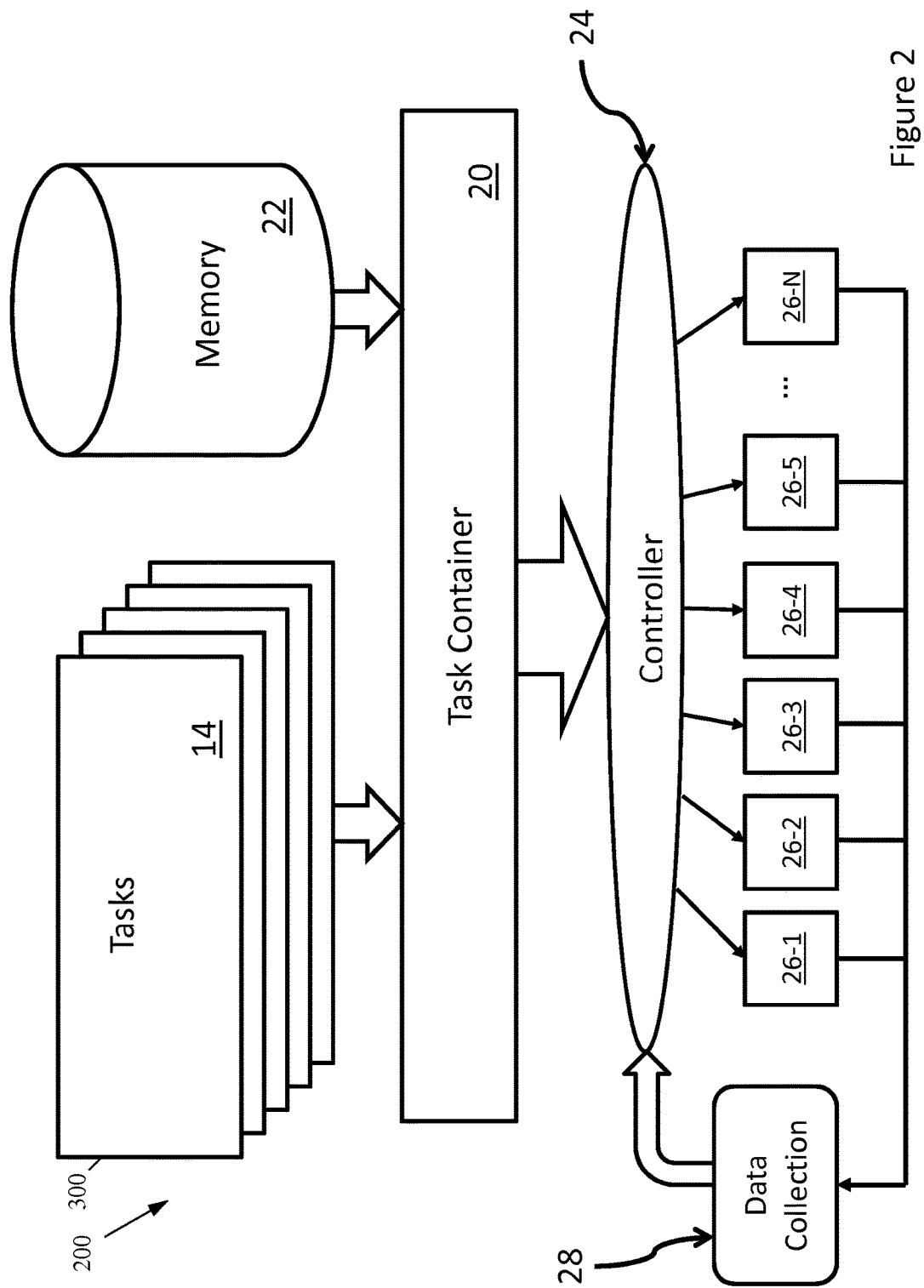
FIG. 2 illustrates the operation of one embodiment.

FIG. 2 is a block diagram of an embodiment that is implemented in software running within the operating system of the multithreaded system. Tasks 14 are provided to task container 20. Memory 22 is connected to task container 20. Task container 20 receives and stores task and caches the memory necessary for that task. The task then awaits instructions from controller 24 that assign the task to one of threads 26-1 to 26-N. In some embodiments, the threads 26-1 to 26-N comprise separate processors; in some embodiments, the threads 26-1 to 26-N comprise cores in a multicore processor; and some embodiments are a combination of both. The term thread is used herein to indicate a discrete processing entity. However, each thread may not be absolutely discrete. Each thread can access memory and utilize other resources. The use of the term discrete herein only refers to the fact that each thread can process tasks relatively autonomously from the other threads. The threads can access independent resources or can access shared resources.

Controller 24 includes a data collection module 28. Data collection module 28 collects statistical data related to the tasks that are running on threads 26-1 to 26-N. For example, data collection module 28 may collect the number of object, memory or register locks issued when tasks are running; the waiting time of synchronization performed within a task group; memory related features like the cache miss rate, and others. This data may be collected in nearly real time and data is collected to determine if it is desirable or necessary to throttle the processors in a subsequent processing cycle. Throttling comprises disabling or de-activating one or more threads to promote more orderly processing, to promote lower power consumption, or to otherwise improve performance of the system. The data collected by the data collection module 28 can reflect the real time resource and system status and comprises a precise input for the throttling decision.

Figure 3:
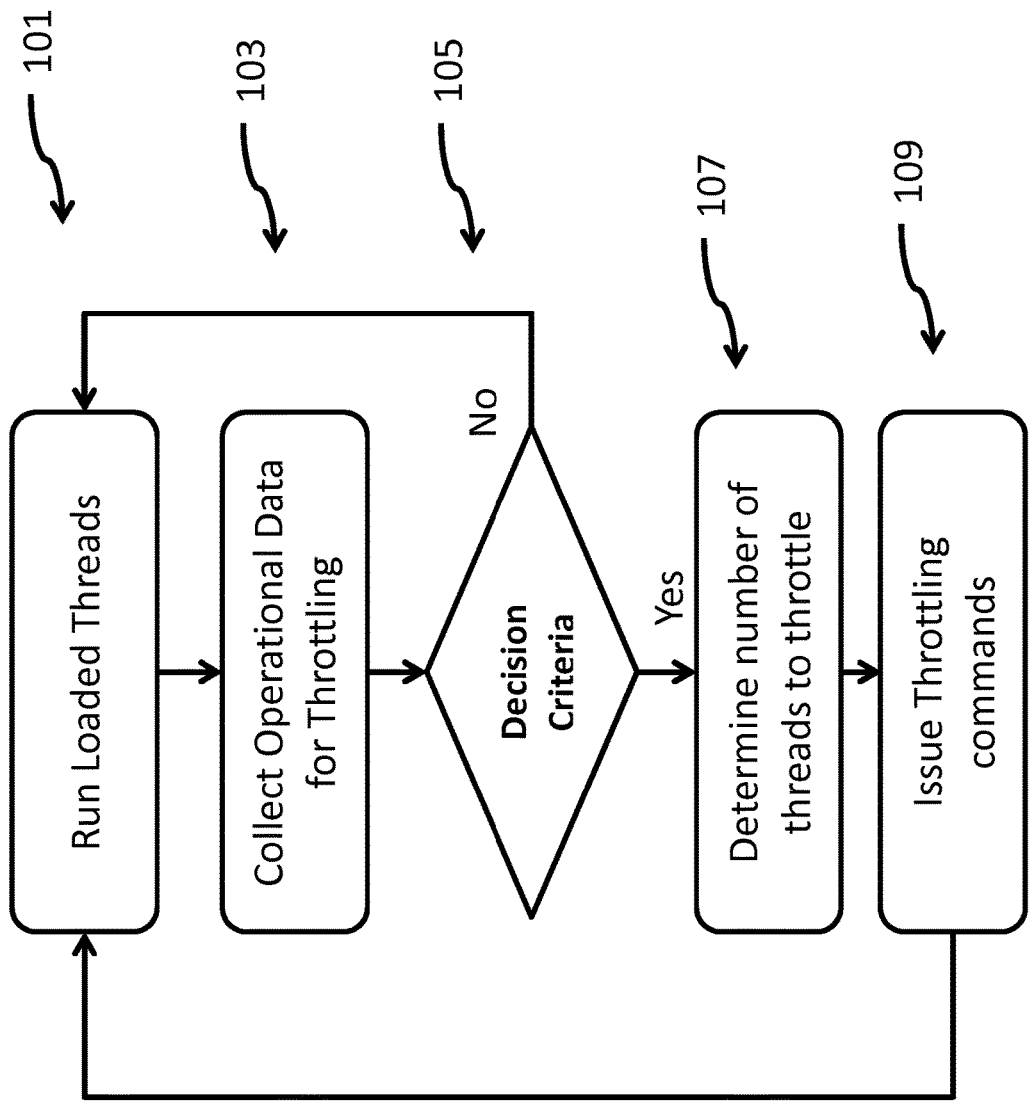
FIG. 3 is a flow diagram of a throttling decision process according to an embodiment.

FIG. 3 is a flow diagram of a throttling decision process according to an embodiment. The threads that are loaded are run in step 101. Data on the operation of the threads is collected in step 103. The data is then analyzed in step 105. This analysis is based on experience and previous experimental results, that is, the analysis is heuristic. If the results of the analyses pass a pre-set threshold, then the decision module in step 107 will output a positive step value k, which indicates that k more hardware threads will be enabled for next processing time interval. If the decision module does not meet the pre-set threshold, then this module will output a negative step value k, which means that the number of hardware threads will be reduced by k in next processing time interval. In step 109, a throttling command based on the k determined in step 107 is issued. In other embodiments k may be increased when the heuristic analysis is below a threshold and vice versa. In yet other embodiments, the integer amount of k may be dynamically determined based on the heuristic analysis.

Throttling is the temporary reduction of the number of threads available for processing. Experiments show, in certain circumstances, that too many threads can hinder the operation of the overall processing system. For example, if the data collection module 28 detects a large overall number of cache misses, temporarily reducing the number of operating threads may actually speed the overall processing throughput. Other examples of relevant data are the time necessary to sync tasks from different threads (one thread needs the results of the other), the number of object locks (where only one thread can access the locked object), and the number of cache misses. In other circumstances, too many threads operating in a particular mode may consume too much power. This is particularly important for portable devices, such as smart phones.

Figure 4:
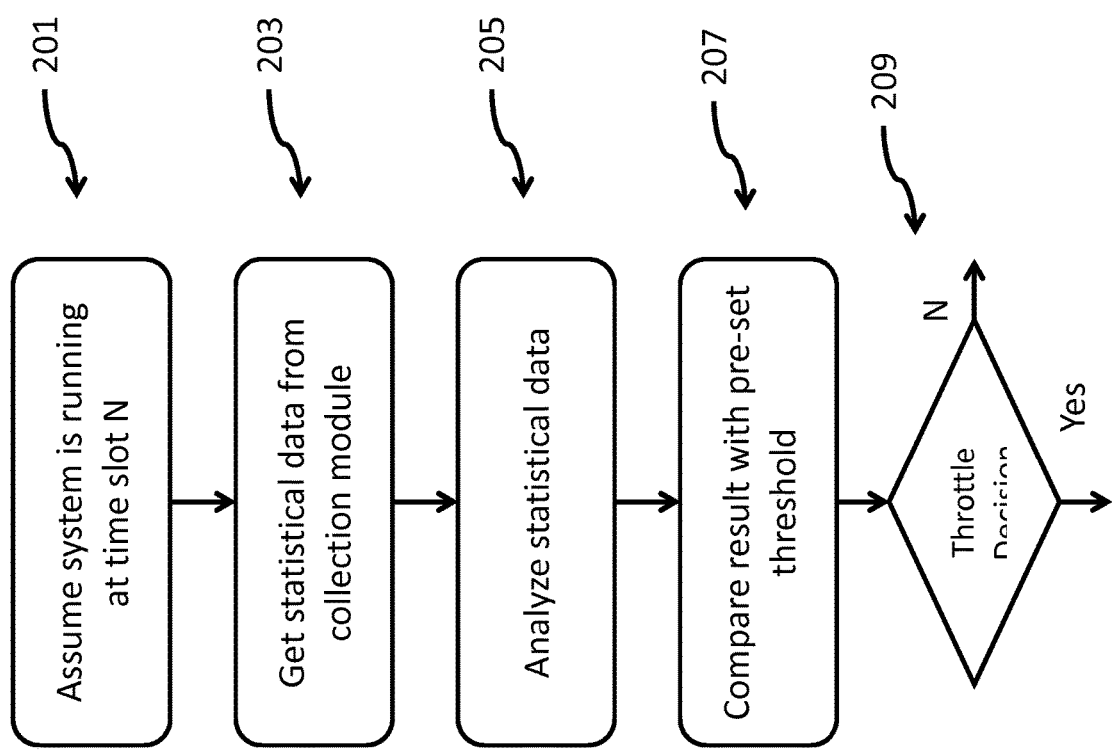
FIG. 4 is a flow diagram of the decision process of the process shown in FIG. 3.

Decision process 105 is further illustrated in FIG. 4. In step 201, it is assumed that the threads are operating in time slot N. In step 203, the data from data collection module 28 is gathered. In step 205, the collected data is analyzed using a heuristic based process using methods such as linear programming or weighted sums of input data. In step 207, the result of this analysis is compared with one or more pre-set thresholds. For example, the preset threshold may be determined heuristically. In step 209, the decision is yes if the result of the data analysis is greater than the pre-set threshold and no if less than the pre-set threshold. In one embodiment a yes output would trigger a positive value for k, meaning that the number of operating threads is reduced by k. An output of no would trigger a negative value for k and the number of threads would increase by k. In other heuristics, a result above a threshold may trigger a negative k value, while below a positive. An additional type of heuristic provides a negative k if the result is lower than a first threshold, a zero k if the result is between the first threshold and a second threshold, or a positive k if the result is above the second threshold. The throttling value of k is applied to the threads during time N+1. The operation of this embodiment is not limited to reducing or increasing the number of threads by k. This method is chosen for its simplicity and operational speed. In addition, this embodiment is not limited in the type of heuristic used. Different system configurations may respond differently, and thus different heuristic analysis can determine that different data is applicable to the analysis. Any method of increasing or reducing the number of operating threads in response to the decision analysis is considered within the scope of this embodiment.

FIG. 5 illustrates the operation of the embodiment of FIG. 2 when the data analysis threshold in step 207 is greater than the threshold. In FIG. 5, it is assumed that no threads were throttled in time N and that k=3. In this case, for example, controller 24 would not assign any tasks to threads 26-1, 26-2 and 26-3 during time N+1, as shown in FIG. 5. In some embodiments there may be other methods of temporarily shutting down threads. For example, in devices where power conservation is more important than speed, the throttled threads may have power removed. However, this would reduce the overall speed of the device due to the power-up time required when the power is reapplied.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method, comprising:
collecting, by a device while a plurality of hardware threads execute tasks in a multicore processor of the device during a first time interval, different data concerning execution of the tasks, wherein the different data comprise information about a number of object locks that are issued, waiting time of synchronization that is performed within a task group, and a number of cache misses, and wherein a hardware thread is a processor in the multicore processor;
performing, by the device, analysis on the different data to produce an analysis result for adjusting a number of the plurality of hardware threads in a subsequent time interval;
comparing, by the device, the analysis result with a predetermined threshold, thereby producing a comparing result, the comparing result indicating an adjustment of the number of the plurality of hardware threads, wherein the comparing result is a first negative value in response to the analysis result being less than the predetermined threshold, the first negative value indicating how many hardware threads of the plurality of hardware threads are to be deactivated, and wherein the comparing result is a second positive value in response to the analysis result being greater than the predetermined threshold, the second positive value indicating how many more hardware threads are to be activated in addition to the plurality of hardware threads; and increasing, by the device, the number of the plurality of hardware threads of the multicore processor during the subsequent time interval based on the second positive value in response to determining that the comparing result exceeds the predetermined threshold.

2. The method of claim 1 wherein the different data further comprises a memory related metric.

3. The method of claim 1 wherein increasing the number of the plurality of hardware threads comprises increasing the number of the plurality of hardware threads by the second positive value.

4. The method of claim 1 wherein the second positive value is dynamically determined based on the collected different data.

5. The method of claim 1 wherein the first negative value is dynamically determined based on the collected different data.

6. The method of claim 1 wherein the comparing result is zero (o) in response to determining that the analysis result falls within a first threshold and a second threshold.

7. An apparatus, comprising:
a storage system storing instructions; and
a multicore processor coupled to the storage system, wherein the multicore processor executes the instructions to:
collect, while a plurality of hardware threads execute tasks during a first time interval, different data concerning execution of the tasks, wherein the different data comprise information about register locks that are issued when the tasks are running, a number of cache misses, and waiting time of synchronization that is performed within a task group, wherein a hardware thread is a processor in the multicore processor;
perform analysis on the different data to produce an analysis result for adjusting a number of the plurality of hardware threads in a subsequent time interval;
compare the analysis result with a predetermined threshold, thereby producing a comparing result, wherein the comparing result is a first negative value in response to the analysis result being less than the predetermined threshold, the first negative value indicating how many hardware threads in the plurality of hardware threads are to be deactivated, and wherein the comparing result is a second positive value in response to the analysis result being greater than the predetermined threshold, the second positive value indicating how many more hardware threads are to be activated in addition to the plurality of hardware threads; and
increase the number of the plurality of hardware threads during the subsequent time interval based on the second positive value in response to determining that the comparing result exceeds the predetermined threshold.

8. The apparatus of claim 7 wherein the different data comprises a number of object locks issued.

9. The apparatus of claim 7 wherein the different data comprises a memory related metric.

10. The apparatus of claim 7 wherein the processor executes the instructions to increase the number of the plurality of hardware threads by the second positive value.

11. The apparatus of claim 7 wherein the first negative value is dynamically determined based on the collected different data.

12. The apparatus of claim 7 wherein the second positive value is dynamically determined based on the collected different data.

13. The apparatus of claim 7 wherein the comparing result is zero (o) in response to determining that the analysis result falls within a first threshold and a second threshold.

14. The apparatus of claim 7 wherein the number of the plurality of hardware threads is increased by the second positive value.

15. A method, comprising:
collecting, by a device while a plurality of hardware threads execute tasks in a multicore processor during a first time interval, different types of data concerning execution of the tasks, wherein the different types of data comprises information about waiting time of synchronization that is performed within a task group, a number of cache misses and a number of object locks that are issued, and wherein a hardware thread is a processor in the multicore processor;
performing, by the device, analysis on the different types of data to generate a result for adjusting a number of the plurality of hardware threads in a subsequent time interval;
comparing, by the device, the result with a first predetermined threshold and a second predetermined threshold, respectively, thereby producing a comparing result, the comparing result being a first positive value in response to the result being greater than the first predetermined threshold, the first positive value indicating how many hardware threads in the plurality of hardware threads are to be deactivated, and the comparing result being a second negative value in response to the result being less than the second predetermined threshold, the second negative value indicating how many more hardware threads are to be activated in addition to the plurality of hardware threads;
determining whether the number of the plurality of hardware threads is to be adjusted based on the comparing result; and
decreasing, by the device, the number of the plurality of hardware threads during the subsequent time interval based on the first positive value in response to determining that the result exceeds the first predetermined threshold.

16. The method of claim 15 wherein the different types of data comprises a memory related metric.

17. The method of claim 15 wherein decreasing the number of the plurality of hardware threads comprises decreasing the number of the plurality of hardware threads by the first positive value.

18. The method of claim 17 wherein the first positive value is dynamically determined based on the collected different types of data.

19. The method of claim 15 wherein the comparing result is zero (o) in response to determining that the result falls within the first predetermined threshold and the second predetermined threshold.

20. The method of claim 15 wherein the second negative value is dynamically determined based on the collected different types of data.

* * * * *